United States Patent [19]

Rayburn

[11] 4,128,857
[45] Dec. 5, 1978

[54] PLEATED METALLIZED FILM CAPACITOR WOUND ABOUT ITS CENTER

[75] Inventor: Charles C. Rayburn, Mt. Prospect, Ill.

[73] Assignee: Illinois Tool Works Inc., Chicago, Ill.

[21] Appl. No.: 814,954

[22] Filed: Jul. 12, 1977

[51] Int. Cl.² .......................................... H01G 1/147
[52] U.S. Cl. ................... 361/309; 361/301; 361/304
[58] Field of Search ............... 361/301, 304, 303, 308, 361/309, 311

[56] References Cited

U.S. PATENT DOCUMENTS

| 2,470,826 | 5/1949 | McMahon | 361/301 |
| 2,919,390 | 12/1959 | Robinson | 361/301 X |
| 3,854,075 | 12/1974 | Uhi | 361/304 X |

FOREIGN PATENT DOCUMENTS 159958  11/1954  Australia .................................. 361/301

Primary Examiner—E. A. Goldberg
Attorney, Agent, or Firm—Glenn W. Bower; Robert W. Beart

[57] ABSTRACT

An electrical capacitor is formed utilizing a thin dielectric layer which is metallized on both sides to provide electrode areas. An unmetallized margin area is provided on one side of the dielectric layer along one longitudinal edge of the dielectric layer and an unmetallized margin area is provided on the other side of the dielectric area along the opposite longitudinal edge dimension of the dielectric layer. The capacitor is formed by pleating, or folding, the dielectric layer along its longitudinal dimension an even number of times so that the unmetallized margin areas extend outwardly beyond the pleats adjacent the same longitudinal edge. The dielectric layer may next be wound to form a wound capacitor segment and then a metallic spray may be directed against the ends of the wound capacitor segment so that leads may be attached to complete the capacitor.

9 Claims, 7 Drawing Figures

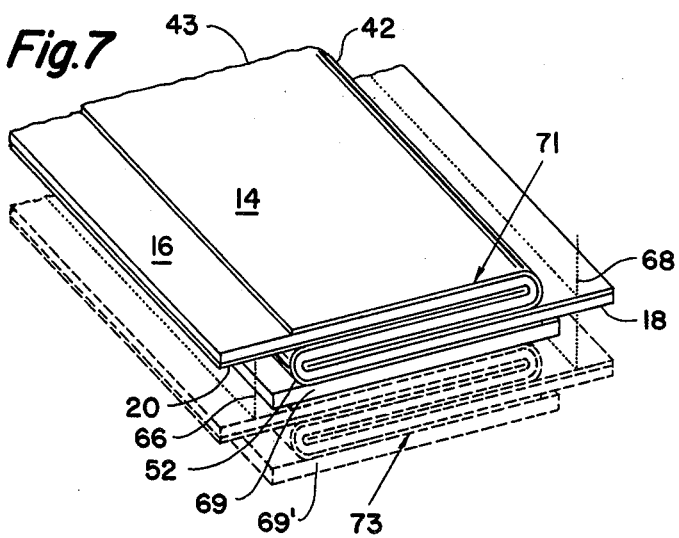

PLEATED METALLIZED FILM CAPACITOR WOUND ABOUT ITS CENTER

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sided metallized dielectric layer is folded an odd number of times in a longitudinal direction. Another double sided pleated metallized dielectric layer capacitor is disclosed in U.S. Pat. No. 3,854,075 issued Dec. 10, 1974, to John Phillip Uhl, and assigned to the assignee of the present invention. In the Uhl patent, a capacitor is disclosed which is formed by pleating a double side metallized dielectric layer an even number of times and then winding the structure about the leads which act as mandrels and are left in the structure. Spraying of the ends of the wound capacitor structure is, therefore, not needed or contemplated by the Uhl patent. The McMahon patent suggests that his dielectric material may then be would along its longitudinal dimension after pleating and that end terminations may then be applied to a wound capacitor segment by spraying metal against the edges of the wound capacitor segment. The types of capacitor envisioned by the McMahon and Uhl patents, if commercially practicable, would be extremely desirable because substantially all of the dielectric layers of these capacitors are in the electric field and these capacitors may be made without the insertion of an additional dielectric layer in the main body of the capacitor, although a short initial unmetallized dielectric strip and a protective terminating dielectric strip could be employed with these capacitors, if desired.

The types of capacitor construction that were suggested in the McMahon and Uhl patents have a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field. Shorter winding lengths per unit capacitance are thereby required, reducing the winding labor. The dielectric lengths can also be calibrated and pre-cut to produce a capacitor of more accurate values. Another advantage of these types of capacitors, if they can be made in a reliable manner, is that there are no air layers between the metallized electrodes and the pleated film surfaces and this substantially increases the voltage, for example, one hundred volts or more, at which corona discharge starts, making these capacitors commercially attractive for new applications such as fluorescent lighting circuits.

However, the construction of commercially successful capacitors as suggested in the McMahon and Uhl patents was hampered by problems that are presented by the attachment of leads to the wound capacitor segments. The McMahon patent suggested that leads could be attached to his capacitor by the well-known Schoop process. The application of high velocity metallic spray coatings to the edges of the capacitor described by McMahon is not commercially practical, however, because the spray will penetrate through the dielectric area at a pleat and thereby short one electrode to the other. If the temperature and pressure of the spray are lowered, penetration of the dielectric layers may be reduced but the adhesion of the metallic spray will generally be very poor. The multiple leads suggested in the McMahon patent also are not satisfactory since they tend to tear the dielectric material and to make the capacitor bulky and inductive.

In order to solve the above mentioned spray shorting problem at a pleated edge, it has been suggested in Australian Pat. No. 159,958, patented on Nov. 24, 1954 to provide unmetallized dielectric strips behind all of the pleats of a pleated metallized capacitor. While this solution may provide a technically feasible method of attaching leads to a pleated metallized dielectric layer capacitor, the number of unmetallized strips that are required on the dielectric layer greatly complicates the manufacturing process for both the dielectric layer itself and the pleated capacitor product. For example, in a capacitor having five pleats, there must be, in addition to the two unmetallized margin areas, five unmetallized strips that run along the entire length of the dielectric material, with three of these strips being on one side of the dielectric layer and two of these strips being on the opposite side of the dielectric layer. It is apparent that the masking problems and the cost of manufacturing such a specialized item make the solution of the Australian patent commercially unattractive. This is especially true since the type of metallized dielectric layer that is used in the capacitor of the present invention, (in which only the margin areas are required), is readily commercially available.

The leads of the capacitor of the Uhl patent were used as mandrels, as previously mentioned, to wind the pleated capacitor segment about the center, in a manner similar to that suggested in U.S. Pat. No. 2,887,649 issued May 19, 1959 to Daniel B. Peck. In the Uhl patent, conductive foil tabs were inserted between the leads and the metallized electrode areas to make positive contact with the electrode and to protect the electrode from damage by the leads during winding. However, it has been determined that this construction leads to a higher failure rate than desirable due to opening of the electrode area around the periphery of the metal foil, for reasons which are not completely understood.

A pleated capacitor having an even number of pleats which may be wound about its center may be achieved in accordance with the present invention whereby lead attachment is provided in a more reliable manner by the application of a metallized spray to the ends of the wound capacitor segment. The previously mentioned Peck patent suggested that metallized end spray could be used to attach leads to a double-sided metallized dielectric layer that was wound about its center. However, the Peck patent did not involve the pleating of the dielectric layer before winding and consequently the electrode areas were exposed to the spray only at their edges. The area of the thin film electrode edges that were exposed to the metallized spray was, therefore, so very small that it was virtually impossible to achieve adequate adhesion of the spray to the edges of the electrodes under commercially acceptable manufacturing processes.

The configuration of the capacitor of the present invention provides a product which has all of the advantages of pleated, or pleated and wound, capacitors and also has the added advantage that it may be manufactured with commercially available metallized dielectric material and wound about the center of the pleated dielectric layer by developed winding techniques. A further advantage of the present invention is that the same basic starting material may be used to manufacture capacitors having a number of different pleating combinations, which, of course, is not true for the capacitor of the Australian patent, in which each pleat combination requires a specially manufactured dielectric layer. In addition to the use of the present invention to manufacture wound film capacitors, it is also possible to utilize the invention to produce ceramic capacitors in which the capacitor dielectric material is folded while the ceramic material is still in a "green" state, in a manner similar to that disclosed in U.S. Pat. No. 3,223,494 issued Dec. 14, 1965 to J. W. Crownover.

DESCRIPTION OF THE DRAWINGS

The present invention is illustrated by reference to the drawings in which:

FIG. 7 is a perspective view of an alternate version of a capacitor constructed in accordance with the present invention.

TECHNICAL DESCRIPTION OF THE INVENTION

Figure 1:
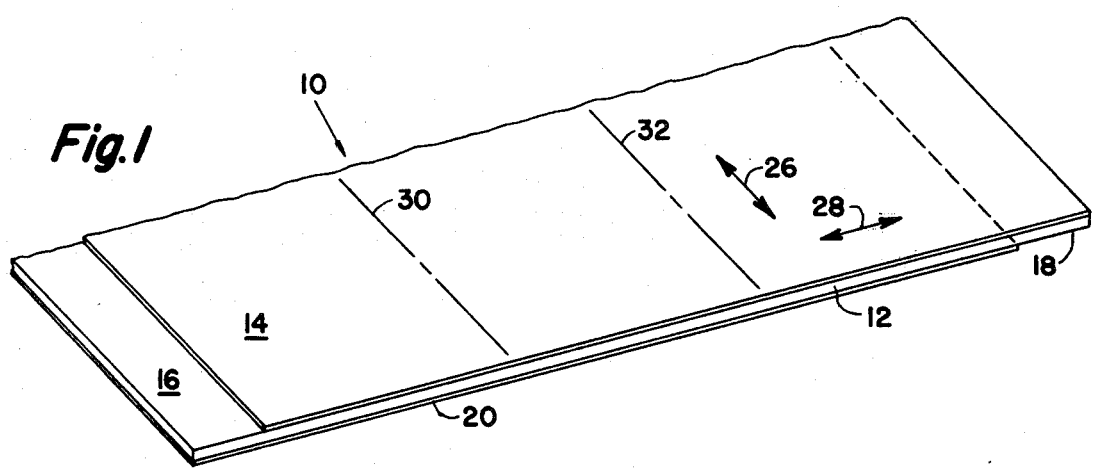
FIG. 1 is a perspective view of a portion of a metallized dielectric layer which may be used in the construction of the capacitor of the present invention.

A portion of a commercially available metallized dielectric strip which may be unwound from a reel, that is suitable for a making of a capacitor in accordance with the present invention is shown in FIG. 1. The metallized dielectric strip is formed with a dielectric layer 12 of a thin film dielectric material, such as polyester, polypropylene, polystyrene, polycarbonate or other suitable material. A thin metallized electrode layer 14 is applied to the upper surface of the dielectric layer 12 and a thin metallized electrode layer 20 is applied to the lower surface of the dielectric layer in such a fashion that unmetallized margin areas 16, 18 extend along the opposite longitudinal edges of the strip 10 on opposite sides of the strip.

In the embodiment shown in FIG. 1, the longitudinal dimension of the metallized strip 10 is shown along the arrows 26 while the narrow transverse dimension is shown along the arrows 28. The capacitor is pleated along two imaginary lines 30, 32 which extend through the length of the strip 10. The capacitor of the present invention, however, is not limited to one in which folding is along two longitudinal lines since a capacitor could be made in accordance with the present invention by pleating along any even number of transverse lines.

Figure 2:
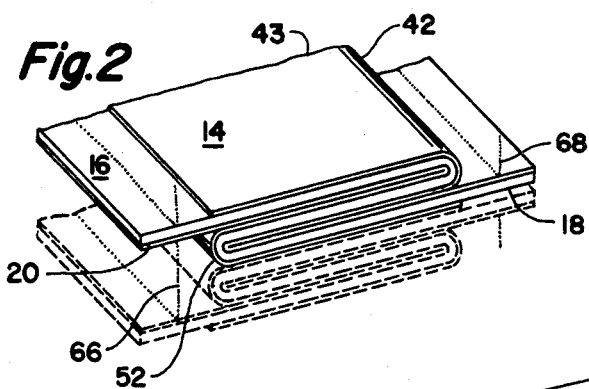
FIG. 2 is a perspective view of a pleated metallized dielectric layer having two pleat lines.

A pleated capacitor is shown in FIG. 2 wherein one pleat occurs along the longitudinal line 30 and another pleat occurs along the longitudinal lines 32. It is to be noted that pleat lines 30, 32 are spaced so that the margin area 18 extends beyond the pleat 42 that runs along the right hand longitudinal edge of the metallized strip 10 of FIG. 1 with the margin area 18 facing downwardly. The extension of the margin area 18 beyond the pleats 42 is preferably at least 0.020 inches. In addition, it is noted that the margin area 16 is positioned so that it extends beyond the pleat 52 that runs along the left hand longitudinal edge of the metallized strip and faces upwardly. Again, the extension of the margin area 16 beyond the pleat 52 is preferably at least 0.020 inches.

Figure 3:
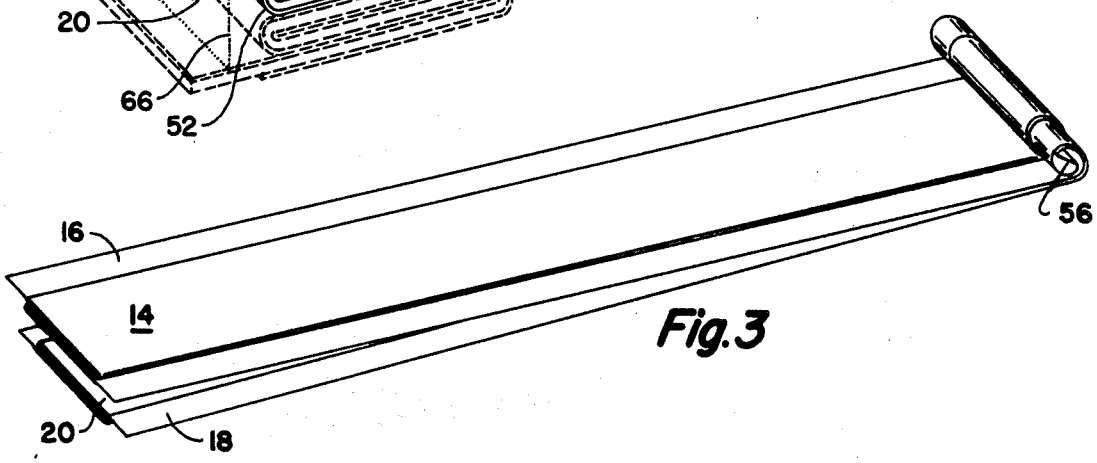
FIG. 3 is a diagrammatic showing of the winding of a capacitor segment in accordance with the construction of FIG. 2.

After the capacitor has been processed to form the capacitor segment shown in FIG. 2, a number of different additional processing steps may be undertaken. For example, the pleated capacitor segment of FIG. 2 could be used to form a capacitor merely by spraying the right and left hand longitudinal edges of the segment with a metallized spray, such as babbitt or other suitable metal, in accordance with conventional practice, and then electrical leads could be secured to them, for example, by soldering. Alternately, the capacitor segment of FIG. 3 could be cut along a transverse line, such as the line 43, and a number of such segments could be stacked upon each other, with the downwardly facing margin 18 of one capacitor segment being adjacent to and aligned with a corresponding upwardly facing margin 18' of the capacitor segment that is positioned immediately below it, as shown diagrammatically by the dotted line representative of FIG. 2, and then their ends could be sprayed with a metallized spray and leads could then be secured to the stacked array of such segments. In conjunction with the presently preferred embodiment of the present invention, however, FIG. 3 represents two layers of a capacitor segment formed by winding of the dielectric strip about the center of the longitudinal dimension of the strip 10, as shown in FIG. 3, to form a wound capacitor segment. Another version of this capacitor could be achieved, however, by pleating, instead of winding, the capacitor segment of FIG. 2 a number of times along transverse fold lines such as the line 43, alternately, the capacitor segment could be pleated transversely two or more times about transverse lines, such as the line 43, or alternately, pleating several times, and then completing the segment by winding the remainder of the length of the dielectric strip.

Figure 4:
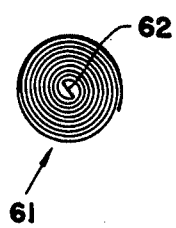
FIG. 4 is an end view of a capacitor segment, before lead attachment, that is wound in accordance with the showing of FIG. 3.

The winding of the capacitor segment of FIG. 2 into a wound capacitor may be achieved with various winding techniques, including the use of a split mandrel such as the mandrel 56 of FIG. 3, which is removed from the capacitor segment after it has been wound. An unmetallized dielectric strip (not shown) may be wound around the structure to form an outer protective coating. This dielectric strip may be heat-sealed to itself to form the pleated capacitor segment 61 which is shown in FIG. 4. The removal of the mandrel 56 from the capacitor segment 61 leaves an opening 62 in the unit. The opening 62 may be closed by applying pressure, or pressure and heat, in accordance with the type of dielectric layer used and conventional manufacturing techniques to the capacitor segment 61 so that it assumes an oval shape as shown in FIG. 5.

Figure 5:
FIG. 5 is an end view of the wound capacitor segment of FIG. 4 after it has been pressed into an oval shape.

Once the capacitor segment of the embodiment of FIGS. 3 through 5 has been wound, a metallized spray may then be directed against the longitudinal edges of the unit in accordance with conventional processing techniques to interconnect the electrode layers along these edges and to provide for the connection of electrical leads to the unit. The metallized spray will penetrate into the open area between the margin 16 areas on the left hand longitudinal edge of the capacitor segment, as shown diagrammatically in FIG. 2 to a depth such as that indicated by the plane 66, so as to make contact with the electrode area 20. The plane 66 indicates the maximum depth that any high velocity spray particles will penetrate and it may thus be located any place between the end of the margin 16 areas of the metallized strip 10 and the edge of the pleat 52. Accordingly, the metallized spray material will extend into the left hand opening of the capacitor between the margin 16 areas far enough to make contact to the facing metallized electrode on the other side of the dielectric strip, but not so far that it will penetrate through the dielectric material at the pleat 52.

Termination to the right hand longitudinal edge of the capacitor segment of FIG. 3 is similarly provided by a metallized spray which extends over the margin 18 area to a depth, such as that indicated by the plane 68, which is sufficient to allow the metallized spray to make good contact to the electrode 14 on the inside of the margin 18 area but which will prevent the penetration of the spray metallic particles through the dielectric at the pleat 42. The location of the plane 68 may be anywhere between the edges of the pleat 42 and the end of the margin area 18 as long as there is sufficient depth of spray to provide adequate contact termination to the electrode area 14. The configuration of the present invention thus provides for reliable lead termination at the longitudinal edges of the capacitor segment of FIG. 2 without the necessity of providing unmetallized longitudinal strips along the inside of the pleats 42, 52, thereby saving considerable processing expenses in the manufacture of completed capacitors of this type.

Figure 6:
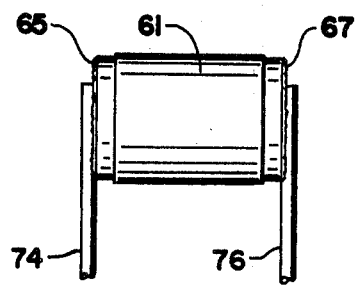
FIG. 6 is a side view of a completed capacitor following the attachment of radial leads.

Once the metallic spray has been applied to the edges of the capacitor segment of FIGS. 4 and 5, either radial or axial leads may be applied to it. For example, axial leads with conventional spiral "pigtail" ends (not shown) may be soldered, arc-welded or connected by other means to the sprayed edge termination layers 65, 67 at the ends of the wound film capacitor segment 61. Alternately, radial leads 74, 76 may be soldered, arc-welded or connected by other methods to the sprayed metallized layers 65, 67 if a radial leaded capacitor is desired, as shown in FIG. 6.

Another alternate version of the present invention is shown in FIG. 7, wherein two layers of either a wound or a stacked capacitor segment is shown. This version differs from that shown in FIG. 2 in that intermediate dielectric layers 69, 69′ are inserted between alternating groups 71, 73 of pleated layers of the capacitor segment which face in opposite directions. If the capacitor of FIG. 7 is to be a wound embodiment, the alternating groups 71, 73 of pleated layers which face in opposite directions may each be supplied from a different pleated segment supply.

The previously described embodiments of the present invention are illustrative, but not exhaustive, of the various types of configurations that may come within the scope of the present invention. For instance, while winding about the exact center of the dielectric strip is preferred, it is apparent that winding about any number of transverse lines offset from the center, but intermediate the ends of the dielectric strip, are intended to be included within the scope of the present invention. It is also apparent that more than two longitudinal pleat lines may be employed in the version shown in FIG. 2.

What is claimed is:

1. An electrical capacitor segment comprising at least one group of pleated layers comprising a dielectric layer, a first metallized electrode layer applied to one side of said dielectric layer so that an unmetallized margin extends along one edge of a pair of parallel edges of said dielectric layer, a second metallized electrode layer applied to the other side of said dielectric layer so that an unmetallized margin area extends along the opposite parallel edge of said dielectric layer, said dielectric layer being pleated an even number of times so that the margin areas of said pleated dielectric strip extend along their respective ends of said pleated dielectric layer beyond the other pleats that extend along the same end as said respective margin areas with said margin areas facing outwardly from adjacent pleats and metallized spray material sprayed against regions of the metallized electrode layers in the vicinity of said margin areas which face inwardly toward adjacent pleats on both of said ends but, without penetration of said spray far enough to contact any of said pleats.

2. An electrical capacitor segment as claimed in claim 1, wherein a lead is secured to each of said metallized sprayed ends of said capacitor segment.

3. An electrical capacitor segment as claimed in claim 1, wherein said dielectric layer is an elongated layer and said capacitor segment is wound about the center of said dielectric strip along the elongated dimension of said layer subsequent to said pleating along longitudinal pleat lines and said metallized sprayed material is applied to the ends of said capacitor after said winding has been completed.

4. An electrical capacitor segment as claimed in claim 3, wherein a lead is secured to each of said metallized sprayed ends of said capacitor segment.

5. An electrical capacitor segment as claimed in claim 3, wherein said dielectric layer is an elongated layer and said capacitor segment is pleated along lines transverse to the elongated dimension of said layer subsequent to said pleating along longitudinal pleat lines so that each pleat folds the strip in half and said metallized sprayed material is applied to the ends of said capacitor after said transverse pleating has been completed.

6. An electrical capacitor segment as claimed in claim 5, wherein a lead is secured to each of said metallized sprayed ends of said capacitor segment.

7. An electrical capacitor comprising a plurality of capacitor segments that are stacked upon each other wherein each capacitor segment comprises a dielectric layer, a first metallized electrode layer applied to one side of said dielectric layer so that an unmetallized margin extends along one edge of a pair of parallel edges of said dielectric layer, a second metallized electrode layer applied to the other side of said dielectric layer so that an unmetallized margin area extends along the opposite parallel edge of said dielectric layer, said dielectric layer being pleated an even number of times so that the margin areas of said pleated dielectric strip extend along their respective ends of said pleated dielectric layer beyond the other pleats that extend along the same end as said respective margin areas with said margin areas facing outwardly from adjacent pleats, and metallized spray material sprayed against regions of the metallized electrode layers in the vicinity of said margin areas which face inwardly toward adjacent pleats on both of said ends, but without penetration of said spray far enough to contact any of said pleats.

8. An electrical capacitor as claimed in claim 7, wherein a lead is secured to each of said metallized sprayed ends of said capacitor segment.

9. An electrical capacitor as claimed in claim 7 wherein alternating ones of said plurality of capacitor segments face in opposite directions and are separated from their neighboring segments by dielectric material.

* * * * *